United States Patent [19]

Kobayashi et al.

[11] Patent Number: 4,513,710

[45] Date of Patent: Apr. 30, 1985

[54] ENGINE IDLING ROTATIONAL SPEED CONTROL DEVICE

[75] Inventors: Nobuyuki Kobayashi; Hiroshi Ito; Nobuhisa Ohkawa, all of Aichi, Japan

[73] Assignee: Toyota Jidosha Kabushiki Kaisha, Toyota, Japan

[21] Appl. No.: 407,169

[22] Filed: Aug. 11, 1982

[30] Foreign Application Priority Data

Aug. 13, 1981 [JP] Japan ................................ 56-126886

[51] Int. Cl.³ ......................... F02D 9/02; F02D 31/00
[52] U.S. Cl. .................................................... 123/339
[58] Field of Search ................................. 123/339, 585

[56] References Cited

U.S. PATENT DOCUMENTS 4,344,399  8/1982  Matsumura et al. ................. 123/339
4,392,468  7/1983  Kobashi et al. ................. 123/585 X Primary Examiner—Tony M. Argenbright
Attorney, Agent, or Firm—Cushman, Darby & Cushman

[57] ABSTRACT

An intake air flow rate control device comprises a bypass passage for bypassing a throttle valve arranged in an intake manifold, flow control valve arranged in the bypass passage and stepping motor for driving the flow control valve. When the throttle valve is substantially fully closed, the stepping motor is driven to control an opening area of the flow control valve so that an engine rotational speed is within a range of a target rotational speed for at least an engine coolant temperature. In the above-described control, a lower limit of a stepping position of the stepping motor is set to prevent the opening area from being reduced beyond a predetermined area in order to prevent engine stall.

6 Claims, 4 Drawing Figures

F I G. 1
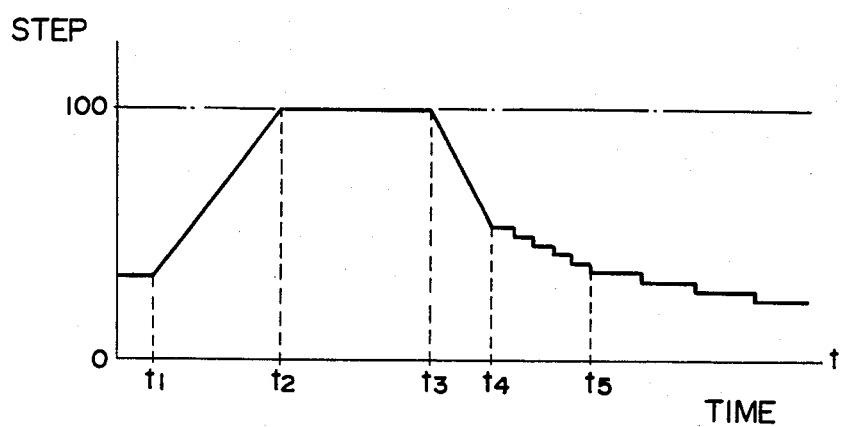
F I G. 2
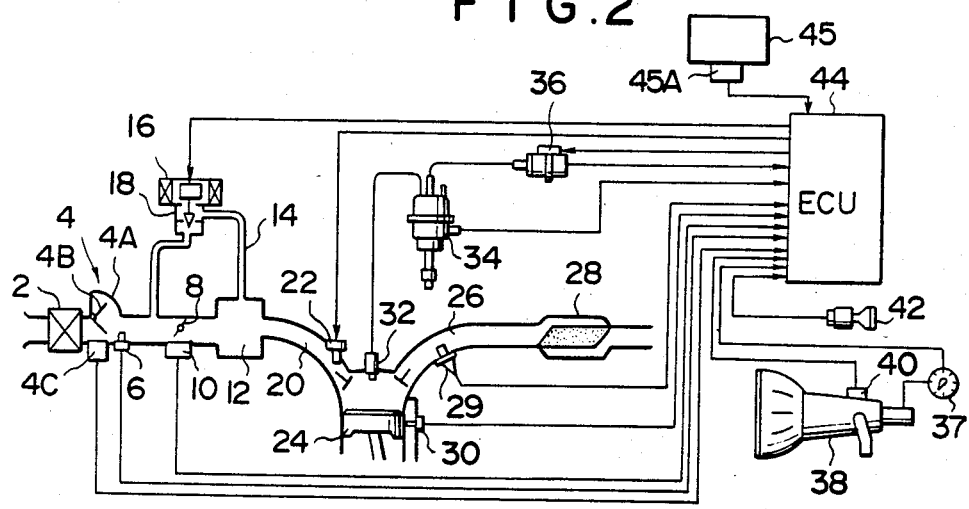

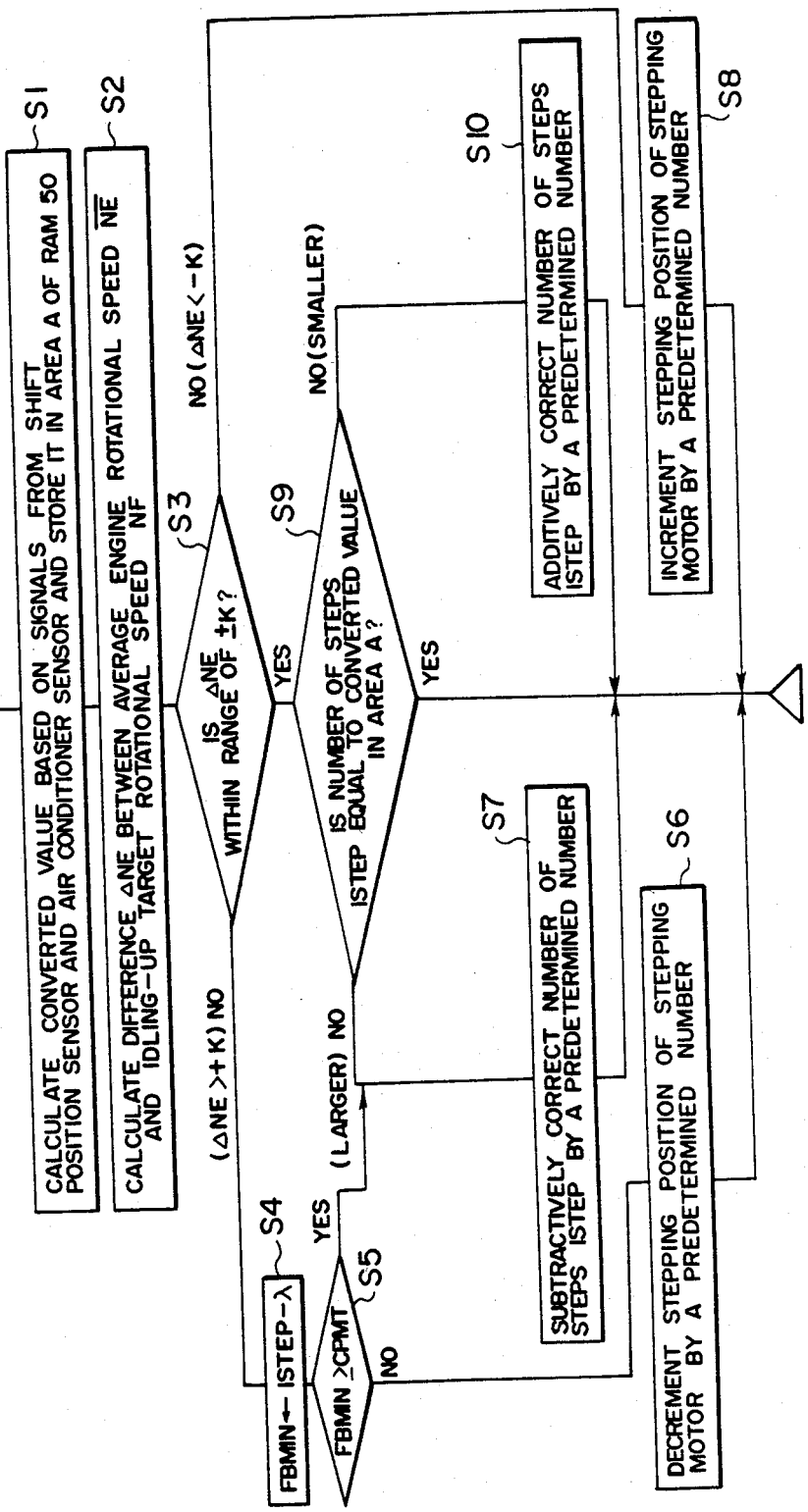

ENGINE IDLING ROTATIONAL SPEED CONTROL DEVICE

BACKGROUND OF THE INVENTION

1. Field of the Invention

The present invention relates to an engine idling rotational speed control device, and more particularly to an engine rotational speed control device for controlling an idling rotational speed of an engine.

2. Description of the Prior Art

In an engine such as an automobile engine, an engine rotational speed control device is usually used in order to maintain smooth rotation of the engine even when a throttle valve is in a full-close position by removal of a foot of a driver from an accelerator pedal in a non-load condition. One type of the engine rotational speed control device comprises intake air flow rate control means for controlling an intake air quantity in the idling position of the engine or the full-close position of the throttle valve, a stepping motor for driving the intake air flow rate control means and an electronic control circuit for controlling the stepping motor in accordance with the operating condition of the engine.

When such a device is used in an engine having an electronically controlled fuel injection device including a throttle body in which the throttle valve for controlling the intake air quantity is arranged and a fuel injection device for injecting fuel to air suctioned into an intake manifold through the throttle body, a bypass passage for bypassing the throttle valve of the throttle body is provided to control the opening area of the bypass passage by an intake air flow rate control valve driven by the stepping motor in the idling condition or the full-close position of the throttle valve in order to control the intake air quantity in the idling condition. With the idling rotational speed control device provided with the air flow rate valve driven by the step motor as described above, in the electronic control circuit, the increase or decrease in pulse number for driving the step motor from the reference position is calculated, whereby the opening degree of the air flow rate control valve is brought into register with the position of the step motor stored in the electronic control circuit, so that the opening degree of the air flow rate control valve can be detected.

As shown in FIG. 1, in the prior art device, when an ignition switch is turned off from its on position at a time $t_1$, the stepping motor is driven to fully open the control valve at a time $t_2$ in order to prevent freeze in a low temperature environment. As the engine is in a full operation at a time $t_3$, the flow rate control valve is abruptly closed by the stepping motor (see a time period between $t_3$ and $t_4$) to attain an idling rotational speed set in accordance with an engine coolant temperature. After a time $t_4$, the step position of the stepping motor is corrected such that a target idling rotational speed for the engine coolant temperature is attained and the step position of the stepping motor is controlled to maintain the target idling rotational speed.

In the above-described device, judgements is made as to whether the engine idling rotational speed should be controlled or not on the basis of a detection of the throttle valve substantially fully closed. However, in general, the above-described control is effected when an accelerator pedal is not only released but also slightly depressed, i.e., the throttle valve is slightly opened. More specifically, under a condition where the throttle valve is slightly opened in a idling operation, the step position of the stepping motor is decremented to reduce the intake air quantity from the intake air flow rate control means so as to maintain the target idling engine rotational speed. Accordingly, if the throttle valve is fully closed by releasing the accelerator pedal after the throttle valve is slightly opened, the engine may stall due to lack of an air flow rate introduced into the engine via the bypass passage.

SUMMARY OF THE INVENTION

It is an object of the present invention to provide an engine idling rotational speed control device which prevents the engine stall when the throttle valve is fully closed after the throttle valve is slightly opened in an idling engine rotational speed control.

It is another object of the present invention to provide an engine idling rotational speed control device in which a lower limit of an openeing area of the intake air flow rate control means is defined so that the engine does not stall in any conditions of the idling control.

In an preferred embodiment according to the present invention, the intake air flow rate control device is feedback-controlled as follows. The intake air flow rate control means comprises a flow control valve and a stepping motor for driving the flow control valve. A converted value ISTA of a stepping position of the stepping motor corresponding to a target idling engine rotational speed is determined in accordance with a selected one of four conversion expressions preset for a N range and a D range of an automatic transmission car and an ON-condition and an OFF-condition of an air-conditioner. A predetermined value is subtracted from the number of steps ISTEP, which has been learned by and stored in the device to determine a lower limit of the stepping motor.

BRIEF DESCRIPTION OF THE DRAWINGS

FIG. 1 is a time chart illustrating a change in stepping position of a stepping motor.

FIG. 2 is a block diagram illustrating one embodiment of the present invention,

FIG. 4 is a flow chart illustrating a process of a feedback control of the embodiment according to the present invention.

DETAILED DESCRIPTION OF THE PREFERRED EMBODIMENT

Figure 3:
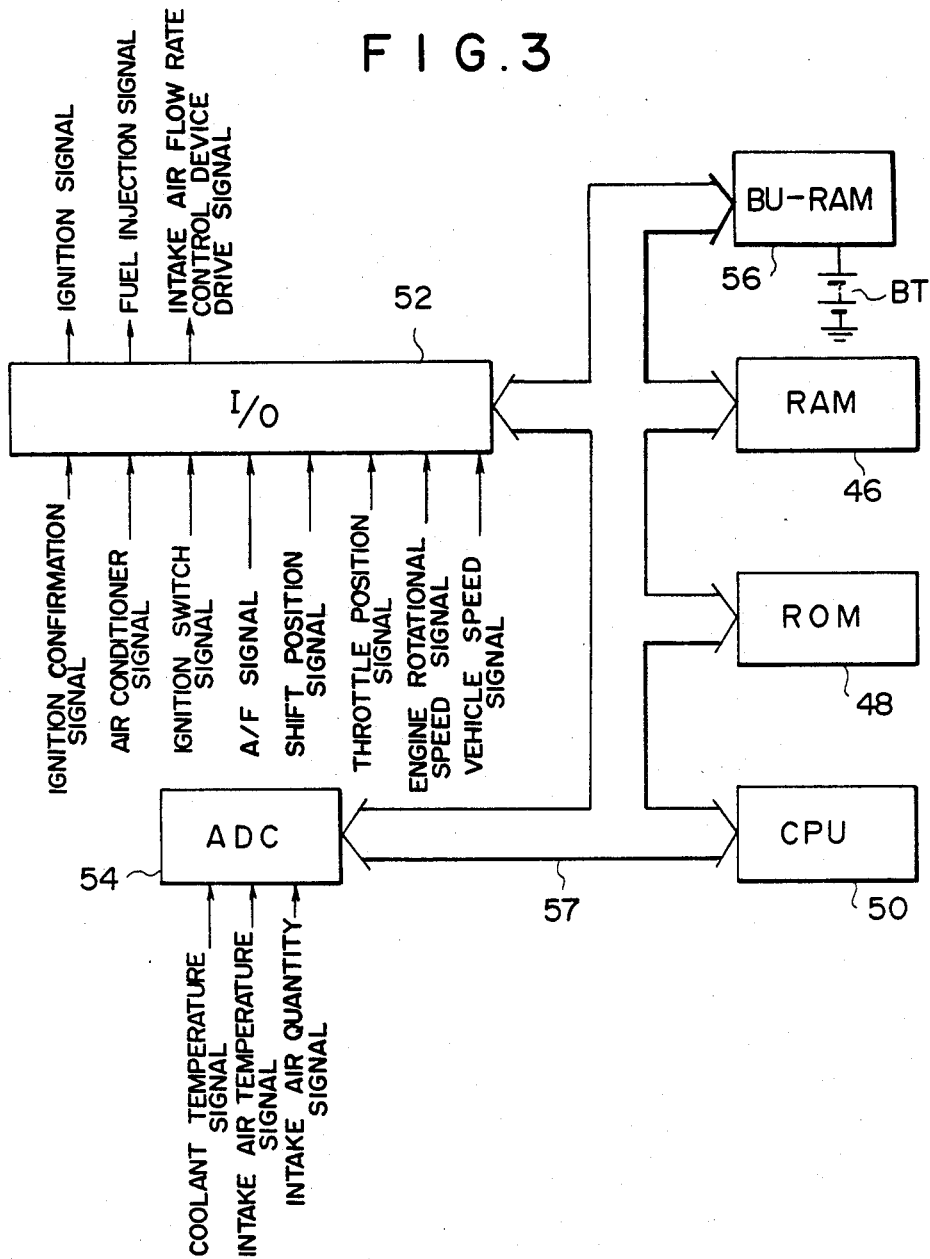
FIG. 3 is a block diagram illustrating an electronic control circuit thereof.

FIG. 2 shows a block diagram of one embodiment of the engine rotational speed control device of the present invention. Detailed description will hereunder be given of such device that is applied to an automatic transmission car. The present embodiment has an air cleaner 2 and an air flow meter 4, which functions as an intake air quantity sensor, arranged downstream of the air cleaner 2. The air flow meter 4 comprises a compensation plate 4B pivotably mounted in a damping chamber 4A and a potentiometer 4C for sensing an opening angle of the compensation plate 4B. The intake air quanitity is thus sensed as a voltage from the potentiometer 4C. An intake air temperature sensor 6 for sensing a temperature of the intake air is arranged in the vicinity of the air flow meter 4.

A throttle valve 8 is arranged downstream of the air flow meter 4, and a throttle sensor 10 such as a throttle switch for sensing an opening area of the throttle valve 8 to produce a throttle position signal is arranged in the vicinity of the throttle valve 8. Provided downstream of the throttle valve 8 is surge tank 12 to which a bypass passage 14 for bypassing the throttle valve 8 is connected. An intake air flow rate control valve 18 which is controlled by a stepping motor 16 is arranged in the bypass passage 14. In general, in an idling condition of the engine, the intake air bypassed the throttle valve 8 flows into the surge tank 12 through the intake air flow rate control valve 18. As will be described later, the opening area of the control valve 18 is feedback-controlled in order to maintain a desired engine idling rotational speed which is related to an operating condition of a motor vehicle.

An intake manifold 20 is connected to the surge tank 12 and a fuel injection device 22 is arranged to extend into the intake manifold 20. The intake manifold 20 is connected to a combustion chamber of an engine 24, which is connected to a catalyst converter 28 filled with a three-way catalyst, through an exhaust manifold 26. Numeral 29 denotes an O$_2$ sensor for controlling an air-to-fuel ratio of a gas mixture to a vicinity of a stoichiometric air-to-fuel ratio, and numeral 30 denotes a coolant temperature sensor for sensing a temperature of an engine coolant.

Ignition plugs 32 of the engine 24 are connected to a distributor 34 which is connected to an igniter 36. Numeral 38 denotes a transmission, numeral 37 denotes a vehicle speed sensor and numeral 42 denotes an ignition switch. The transmission gear 38 is provided with a shift position sensor 40 having a neutral start switch for sensing a neutral position and a drive position of a shift lever.

The distributor 34 is provided with a gear-shaped signal rotor or a timing rotor fixed to a distributor shaft and a pickup mounted on a housing of the distributor 34 to oppose to teeth of the signal rotor. As the signal rotor rotates, the amount of magnetic flux which link to the pickup changes so that an engine rotational speed signal is produced. The signal rotor and the pickup form an engine rotational speed sensor.

An air-conditioner 45 for regulating an inside temperature and an inside humidity of the motor vehicle and for purifing an inside air thereof is arranged under an instrument panel in the motor vehicle. The air-conditioner 45 is provided with an air-conditioner sensor 45A which outputs an air-conditioner ON signal when the air-conditioner 45 is energized.

Referring to FIG. 3, an electronic control circuit 44 which receives signals from the vehicle speed sensor 37, the shift position sensor 40 and other sensors comprises a random access memory (RAM) 46, a read-only memory (ROM) 48, a central processing unit (CPU) 50, an input/output circuit (I/O) 52, an analog-to-digital converter (ADC) 54 and a backup random access memory (BU-RAM) 56. The BU-RAM 56 is powered from a separate battery BT and a memory content thereof is not erased by other than write instruction. The RAM 46, ROM 48, CPU 50, I/O 52, ADC 54 and BU-RAM 56 are interconnected through a bus 57 including a data bus.

The following conversion expressions used in a hot idling control (which is effected when an engine coolant temperature is higher than 70° C.) are stored in a ROM 48. A converted value ISTA calculated in accordance with one of the conversion expressions is compared with the number of steps ISTEP which has been stored in a BU-RAM 56 when the hot idling control was effected.

Respective conversion expressions for calculating the converted value ISTA are given as follows in accordance with positions of a shift lever which are detected by the shift position sensor 40 and operational conditions of the air-conditioner which are detected by the air-conditioner sensor 45A.

(i) When the shift lever is in a neutral position (N range) and the air-conditioner 45 is OFF.

$$ISTA = CPMT - \frac{NF - \beta_1}{\alpha_1} \quad (1)$$

(ii) When the shift lever is in a drive position (D range) and the air-conditioner 45 is OFF.

$$ISTA = CPMT - \gamma_1 - \frac{NF - \beta_2}{\alpha_2} \quad (2)$$

(iii) When the shift lever is in the neutral position (N range) and the air-conditioner 45 is ON.

$$ISTA = CPMT - \gamma_2 - \frac{NF - \beta_3}{\alpha_3} \quad (3)$$

(iv) When the shift lever is in the drive position (D range) and the air-conditioner 45 is ON.

$$ISTA = CPMT - \gamma_3 - \frac{NF - \beta_4}{\beta_4} \quad (4)$$

Where, $\alpha_1$–$\alpha_4$, $\beta_1$–$\beta_4$ and $\gamma_1$–$\gamma_3$ are constants, CPMT is a stepping position of the stepping motor stored in the BU-RAM 56, and NF is a target engine idling-up rotational speed for a given engine coolant temperature and is stored in ROM 48 as a table for each of the conditions (i)–(iv). The converted valve ISTA calculated in accordance with one of the conversion expressions (1)–(4) is stored in an area A of the RAM 46. The previous number of steps ISTEP and the stepping position CPMT corresponding to the stepping position of the stepping motor 16 has been stored in the BU-RAM 56.

The number of steps ISTEP can be stored in the BU-RAM 56 as 12-bit data, 6-bits of which are used as an integer value field for number of steps ISTEP and 5-bits of which are used as a correction value field which is stepped at every 32 cycles.

Applied to the I/O 52 are the engine rotational speed signal from the distributor 34, the throttle position signal from the throttle sensor 10, the shift position signal from the shift position sensor 40, the ignition switch signal from the ignition switch 42, the ignition confirmation signal from the igniter 36, the vehicle speed signal, the air conditioner signal and the air-to-fuel ratio signal from the O$_2$ sensor 29, and the I/O 52 produces an intake air flow rate control device drive signal for controlling the intake air flow rate control device 18, a fuel injection signal for controlling the fuel injection device 22 and an ignition signal for controlling the igniter 36 and the like. The ADC 54 receives the intake air quantity signal from the air flow meter 4, the intake air temperature signal from the intake air temperature sensor 6 and the coolant temperature signal from the coolant temperature sensor 30. Those signals are converted to digital signals by the ADC 54.

The ROM 48 stores therein maps and tables for various operating conditions of the engine, in addition to the tables described above, and the I/O 52 and ADC 54 receive and supply various signals for the operating conditions of the engine, in addition to the signals described above.

An operation of the present embodiment will be described hereunder with reference to FIG. 4. First of all, a feedback control of the intake air flow rate control valve 18 is briefly explained.

The opening area of the intake air flow rate control valve 18 is feedback-controlled so that the engine rotational speed is brought into a desirable engine rotational speed for a given engine coolant temperature in the hot idling control, which is effected when the engine coolant temperature is higher than 70° C. The stepping position of the stepping motor 16 is controlled to adjust the opening area of the intake air flow rate control valve 18. The control valve 18 is feedback-controlled under the following conditions. In N range, when the engine coolant temperature is higher than 70° C. and the throttle sensor 10 is ON, i.e., the throttle valve is substantially fully closed, and in D range, when the engine coolant temperature is higher than 70° C., a vehicle speed is less than 2 Km/h and the throttle sensor is ON, the feedback control is effected. The feedback control is stopped when the value of the motor stepping position CPMT stored in BU-RAM 56 reaches a predetermined value.

In the feedback control, the engine rotational speed is measured for a predetermined time period, e.g., 2 sec, after a predetermined time period, e.g. 2 sec, has elapsed since a condition of the above-described feedback control was fulfilled, and an average engine rotational speed is calculated. If the average engine rotational speed is beyond an upper or lower limit of the target engine rotational speed, the stepping motor 16 is driven by one step. If the condition of the feedback control is lost in the course of the feedback control, the feedback control is stopped.

Referring to FIG. 4, in a Step S1, a single from from the shift position sensor 40 and an ON signal from the air-conditioner sensor 45A indicating the activation of the air-conditioner 45 are taken into the CPU 54, one of the above-described conversion expressions (1)–(4) stored in the ROM 48 is selected based on those signals and the target idling-up engine rotational speed NF is determined based on the engine coolant temperature. In addition, the target idling-up engine rotational speed NF is placed into the selected conversion expression to calculate the conversion value ISTA, which is then stored in the area A of the RAM 46.

In a Step S2, a difference $\Delta$ NE between the average engine rotational speed $\overline{NE}$ (which may be an average engine rotational speed in two seconds) and the target engine idling-up rotational speed NF is calculated. In a Step S3, it is checked if the difference $\Delta$ NE is within a predetermined range $\pm K$ (e.g., K=20 rpm), and if $\Delta$ NE$>+K$, the process goes to a Step S4 in which a given constant $\lambda$ (e.g., $\lambda$=3) is subtracted from the number of steps ISTEP stored in the BU-RAM 56, and the resulting difference is used as a feedback lower limit FBMIN which is then stored in an area FF of the RAM 48. Then the process is shifted to a Step S5.

In the Step S5, the stored feedback lower limit FBMIN is compared with the current stepping position CPMT of the stepping motor 16. If the feedback lower limit FBMIN is smaller than the motor stepping position CPMT, the process goes to a Step S6 in which the stepping position of the stepping motor 16 is decremented by one step so that the opening area of the flow rate control valve 18 is reduced. On the contrary, if the feedback lower limit FBMIN is larger than the current stepping position CPMT stored in the BU-RAM 56, the process goes to a Step S7 in which the stepping position of the stepping motor 16 is not changed but the number of steps ISTEP is downwardly corrected by 1/32 step and the corrected number of steps is stored in the BU-RAM 56 as a new number of steps ISTEP. In this manner, the number of steps ISTEP in the BU-RAM 56 is updated in a learned mode.

In the Step S3, if the decision is $\Delta$ NE$<-K$, the process goes to the Step S8 in which the stepping position of the stepping motor 16 is incremented by one step to increase the opening area of the flow rate control valve 18.

In addition, if $\Delta$ NE is within the predetermined range $\pm K$, the number of steps ISTEP is corrected so that the number of steps ISTEP is rendered to be equal to the converted value ISTA. More specifically, in a Step S9, the converted value ISTA is compared with the number of steps ISTEP. If the ISTEP is larger than the ISTA, the process is shifted to a Step S7 where a predetermined value (e.g. 1/32 step) is subtracted from the number of steps ISTEP and resulting difference is stored in the BU-RAM 56 as a new number of steps ISTEP. In the Step S9, if the ISTEP is smaller than the ISTA, the process is shifted to a Step S10 in which a predetermined value (e.g. 1/32 step) is added to the number of steps ISTEP to correct the number of steps ISTEP. The resulting sum is stored in the BU-RAM 56 as a new number of steps ISTEP. If the number of steps ISTEP is equal to the converted value ISTA in Step S9, the correction is not effected.

In summary, the idling-up engine rotational speed is placed into the conversion expression determined based on information from the shift position sensor 40 and air-conditioner sensor 45A to calculate the converted value ISTA. When the engine rotational speed is within a predetermined range, the stepping position of the stepping motor 16 is not controlled but the number of steps ISTEP stored in BU-RAM 56 is corrected by the converted value ISTA. When the engine rotational speed is beyond the predetermined range, judgement is made as to whether or not an actual step position of the stepping motor 16 reaches the feedback lower limit FBMIN. If not, the flow rate control valve 18 is opened or closed by the stepping motor 16. If yes, the feedback control is stopped to only correct the number of steps ISTEP stored in BU-RAM 56.

In accordance with the preferred embodiment of the present invention, the engine may not stall even if the throttle valve is fully closed after the accelerator pedal has been slightly depressed and the above feedback control is effected to decrement the stepping position of the stepping motor. Because the stepping position of the stepping motor is not smaller than the lower limit FBMIN.

Further, the feedback lower limit FBMIN is set based on the number of steps ISTEP which has been learned in a previous hot idling control and is updated. Accordingly, the idling engine rotational speed can be controlled without aging effect and in optimum conditions.

In addition, in a fast idling control which is effected until the engine coolant temperature reaches at 70° C., although the engine rotational speed is controlled by a different process from the above-described process, an explanation of the different process is omitted since this different process does not relate to the present invention.

What is claimed is:

1. An engine idling rotational speed control device comprising:

a throttle valve provided in a main intake passage and adapted to be substantially fully closed when an accelerator pedal is released;

a flow rate control valve provided in a bypass intake passage for controlling intake air quantity taken into a combustion chamber of an engine through said bypass intake passage;

a stepping motor for driving said flow rate control valve; and an electronic control circuit means for:

controlling a step position of said stepping motor such that an engine rotational speed becomes within a target rotational speed range;

learning, whenever said engine rotational speed is within said target rotational speed range, an idle step number for the step position of said motor such that said idle step number coincides with a converted value, which value is obtained by cancelling an incremental step number for an idle up, required in accordance with a load on the engine and a coolant temperature, from a current step position of the stepping motor, said converted value being indicative of a step position converted by substituting a predetermined standard engine load and coolant temperature for the engine load and the coolant temperature which are used to control a current step position; and determining a lower limit by subtracting a predetermined value from said idle step number, said lower limit being large enough to prevent full-close state of said intake air flow rate control valve, whereby said intake air flow rate control valve is prevented from being closed below said lower limit.

2. An engine idling rotational speed control device according to claim 1, wherein said incremental step number includes a first value predetermined in accordance with a shift position of an automatic transmission car and the ON-OFF state of an air-conditioner and a second value calculated on the basis of a target rotational speed determined by using the coolant temperature.

3. An engine idling rotation speed control device according to claim 1, wherein said converted value is obtained from one of conversion expressions predetermined for a first condition in which the shift position of an automatic transmission car is in a drive range and the air-conditioner is in an ON state, second condition in which the shift position is in the drive range and the air-conditioner is in an OFF state, third condition in which the shift position is in a neutral range and the air-conditioner is in the ON state and a fourth condition in which the shift position is in the neutral range and the air-conditioner is in the OFF state.

4. An engine idling rotational speed control device according to claim 1, wherein said lower limit is set when a current engine rotational speed is higher than said target rotational speed and beyond said range, said stepping motor is driven to reduce the flow rate of air introduced into said engine through said flow rate control valve when said lower limit is smaller than a current step position of said stepping motor, and a decrement of the step position of the stepping motor is forbidden not so as to reduce the intake air flow quantity through said bypass intake passage, when said lower limit is greater than the current step position of said stepping motor.

5. An engine idling rotational speed control device according to claim 1, wherein said idle step number is learned by a value less than 1.0 at every learning timing.

6. An engine idling rotational speed control device according to claim 1, wherein said standard engine load is a load which is adapted to be applied to the engine whenever a shift position is in a neutral state and an air-conditioner is in an OFF state, and the standard coolant temperature is set to be generally within the range of 70° C–80° C.

* * * * *